Nov. 8, 1960

E. H. WELCH 2,959,443

LINK ASSEMBLY RELEASE

Filed July 9, 1957

INVENTOR
EVAN H. WELCH
BY Wade Koonty
Ruth Cadier
ATTORNEYS

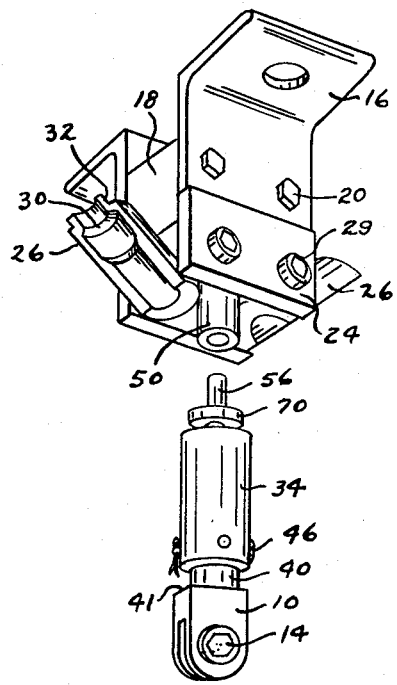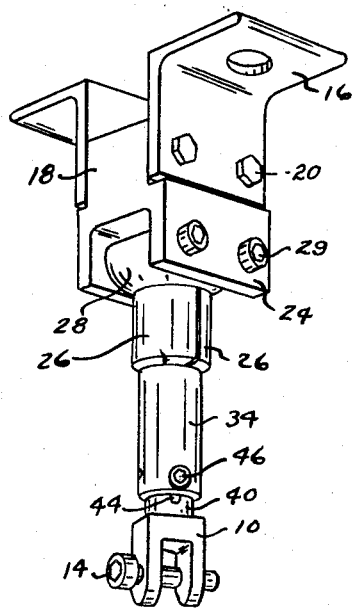

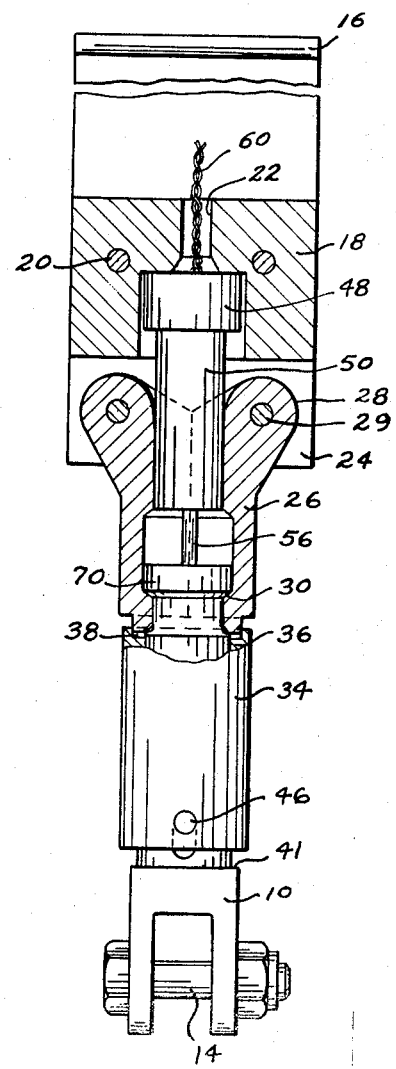

United States Patent Office 2,959,443
Patented Nov. 8, 1960

2,959,443

LINK ASSEMBLY RELEASE

Evan H. Welch, Hanna, Ind.
(59 Waynel Circle, Fort Walton Beach, Fla.)

Filed July 9, 1957, Ser. No. 670,838

4 Claims. (Cl. 294—83)

(Granted under Title 35, U.S. Code (1952), sec. 266)

The invention described herein may be manufactured and used by or for the United States Government for governmental purposes without payment to me of any royalty thereon.

This invention relates to a link assembly release and more particularly to an explosively operated severing mechanism.

Existing release mechanisms are, for the most part, actuated either by electric solenoids which provide a very limited amount of force or by hydraulic or pneumatic methods which entail complex storage sources or auxiliary compressors and complicated associated components.

An object of the present invention is to provide a trigger force for severing devices with a minimum of accessory equipment and a minimum of space and weight requirements.

A further object of the invention is the provision of amplified mechanisms to be attached to aircraft structures for the severing of any equipment which may have to be released during flight.

A further object of the invention is the provision of a small light-weight versatile severing device with high-load capacity and a high range of application for attaching two objects together and releasing them at the will of the operator.

A further object of the invention is the provision of a suspension link assembly means for attaching any load to an aircraft, which means can be severed, and the load released at will.

Further objects and advantages will appear as the description proceeds.

Fig. 2 is a perspective view of the load suspension link and severing device in assembled condition.

Fig. 3 is a perspective view of the components of the device, showing them in severed condition.

Fig. 4 is a vertical cross section of the device shown in Fig. 1, taken at an angle of 90° thereto and on a reduced scale.

Figure 1:
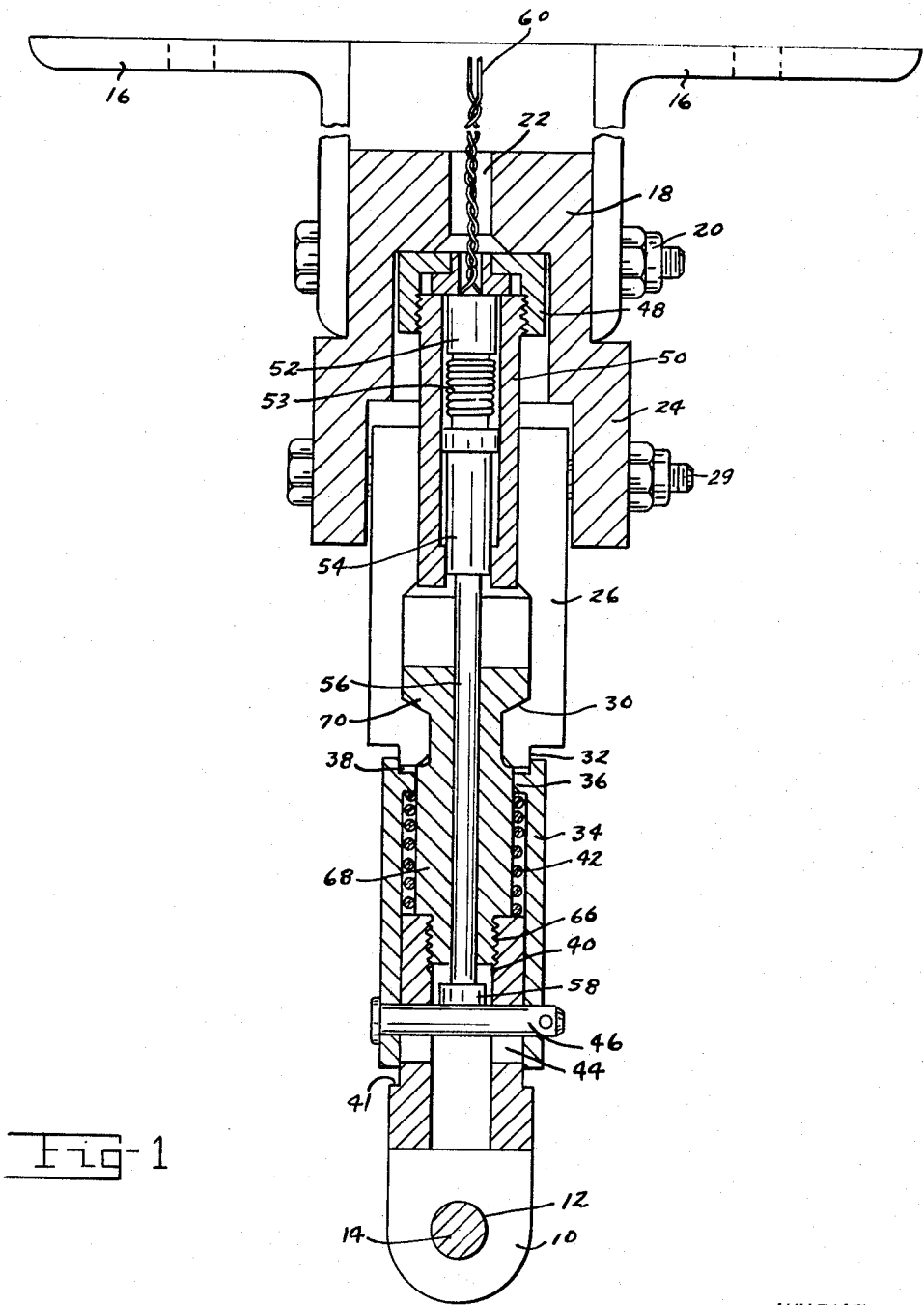
Fig. 1 is a vertical cross section of the assembled load suspension and severing device of the invention.

Referring more particularly to the drawing in detail:

A yoke or load carrying member 10 is provided with eyes 12 and pin 14. The load to be dropped, or other element to be severed, is secured to the yoke 10 by means of the pin 14, or in any other expedient manner.

A pair of angle irons 16 as shown constitute a support for the whole linkage device. These supports 16 may be of any desired form. The angle irons 16 were contrived for experimental purposes and any other type of hangers may be substituted. They are mounted on or in an aircraft structure or other carrier from which an object or load is to be dropped or otherwise severed.

Between these two elements 16 and 10, one attached to the plane and the other to the load, a severing device has been contrived which is the essence of the present invention. A block 18 is secured between and to the supports 16 by bolts 20 or by any other suitable or expedient means. The block 18 is provided with an axial bore 22 and a pair of spaced parallel flanges 24. The flanges 24 pivotally support thereon, a pair of half cylindrical locking link members 26, which when closed or in juxtaposition form a cylinder. At the pivotal area of the members 26, a pair of rounded or curved portions 28 are each pivoted to a flange 24 by means of the pivot bolts 29. This arrangement expedites pivoting and separation of the lower ends of the members 26. The half cylindrical members 26 are each provided with an internal concave conical surface or shoulder 30, and an annular reduced neck portion 32.

A load suspension sleeve 34 is provided with an inwardly extending annular shoulder 36 which forms a recess 38 for receiving the neck 32. This interengagement of these two members forms a latch which is the critical latching connection that keeps the free ends of the links 26 together.

The yoke 10 is provided with a reduced diameter cylindrical sleeve portion or shank 40 which forms a shoulder 41. The portion 40 is received within the sleeve 34. The shoulder 36 and the upper end portion of the member 40 form the upper and lower seats for a compression spring 42 which spring biases the member 34 upward and maintains its connection with the members 26 through the latch device described above. The depth of the recess 38 is in practice of the order of ⅛ inch, but the invention is not limited by this dimension.

The sleeve 40 is provided with a pair of axial, diametrically placed slots 44. A pin 46 extends transversely through the sleeve 34 and the sleeve 40, riding in the slots 44. When the link assembly is in connecting condition, the pin 46 is at the top of the slot 44. It is biased to this position by the spring 42, and any load added at 10 or 12 adds downward pressure to the member 40.

The yoke member 18 seats an abutment nut 48 which is internally screw threaded, and anchors a sleeve 50. The sleeve 50 forms a housing for an explosive motor, an explosive cartridge, or other explosive impelling means shown at 52. The motor is provided with a bellows or other expansion means 53. A piston or plunger, or driving pin 54, explosively actuated, contacts the end of an axially extending pin 56 and impels it downward. The axial pin 56 has a head member 58 which lies in abutting contact with the transverse pin 46.

Firing circuit wires 60 enter the bore 22 of the block 18. When this firing circuit is closed, detonation is provided for the motor, squib or other explosive driving means.

The shank 40 has an internal screw thread which engages a reduced threaded portion 66 on an axially bored load sustaining member 68. The axial pin 56 extends through the bore of the member 68 and has sliding relationship therewith. An annularly flanged conical head 70 on the member 68 abuts the complementary conical shoulder 30 when the free ends of the two link members are latched together.

The operation of the device is as follows:

When the firing circuit lead-in 60 is energized, a detonating impulse is transferred to the motor 52 and a squib therein is exploded. The piston 54 impels the axial pin 56 downwardly. The head 58 pushes the transverse pin 46 downwardly in the slots 44, and the sleeve 34 travels an equal distance downwardly with it. After the sleeve moves approximately ⅛ inch downwardly the interengaging shoulder 32 and recess 38 on the members 26 and 34 disengage, and the conical head 70 pressuring against the inclined abutting surface 30 causes the freed end of the half cylinders 26 to swing outwardly about their pivots 20, and the conical surfaces to slide relative to each other. This outward swing rotation is the result of a force component normal to the axial line of the link assembly. The angle of the abutting surfaces is approximately two degrees greater than the angle at which motion impends due to frictional resistance. The lower end of the sleeve 34, travelling downwardly under the impact of the explosion of the squib, may strike the shoulder 41 on the yoke 10, providing additional pressures on the conical sliding surfaces to provide a shock or jar to assist in quick separation of the members 26 and release of the member 70.

The link connection is thus severed and the load falls away. Members 10, 40, 68 and 56 fall away with the load as seen in Fig. 3.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A releasable link mechanism for releasing loads from an aircraft comprising, a block attachable to an aircraft and having a transverse recess therethrough, a pair of pivot pins positioned on the same vertical level and transversely spaced, said pivot pins being secured to said block and extending through said recess, a pair of complementary mated members each pivoted to one of said pivot pins and each provided with a semi-cylindrical portion capable of mating to form a vertically positioned cylinder having an axial bore, a load carrying member extending a portion of its length into the bore, a sleeve on said load carrying member having limited sliding movement with respect thereto, the lower portion of said cylindrical member adapted to slide into said sleeve to form a latch for preventing pivotal movement of said complementary members, biasing means for biasing said sleeve upwardly into engagement with said mated members, said load carrying member provided at its upper end with an axial bore and an annular bevelled portion, a transverse pin immovably secured to and extending completely through said sleeve at its lower portion and slidable with respect to said load carrying member, complementary bevelled interengaging shoulders on said load carrying member and the bore of said cylinder, the interaction therebetween effecting separation of said cylinder when said latch has been released, an explosively propelled pin extending through the bore in said load carrying member and abutting said transversely extending pin for propelling said sleeve downwardly for allowing separation of said cylinders.

2. A vertically mounted release device for releasing loads held against gravity comprising, a block member adapted to be attached to an aircraft, a pair of mated and complementary half cylindrical members, a pivot for each half member located in said block, said mated half members being capable of forming a vertically disposed completed cylinder when in juxtaposition, and also capable of swinging outwardly away from each other each about its pivot, a load carrying member, a head on said load carrying member engaged and held by said half cylinders when in juxtaposition, a sleeve slidably mounted on said load carrying member, a pin rigidly secured at its ends in said sleeve, said pin extending transversely through said load carrying member, and slidable in a slot therein, the upper end of said sleeve being adapted to encompass the lower end of said mated members for maintaining said mated members in completed cylindrical formation and said head impaled therebetween, biasing means for biasing said sleeve upwardly into engagement with said mated members, a piston slidable in the bore of said load carrying member and capable of impinging on said pin to move said sleeve downwardly to disengage said slidably interengaging elements to disengage said load carrying member, and means for explosively moving said piston downwardly to effect said disengagement.

3. In a load support and load release mechanism, a support attachable to an aircraft, a pair of mated complementary half cylindrical members, each separately pivoted in said support and movable about their pivots to form a vertically disposed cylinder when in complementary juxtaposition, an interior annular shoulder on each of said half members, a load carrying member, a conical head on the upper end of said load carrying member supported on said interior annular shoulder when said half members are in cylinder-forming juxtaposition, a sleeve slidably secured on said load carrying member, the upper portion of said sleeve being adapted to encompass a portion of said half cylinders for maintaining said half cylindrical members in juxtaposition for securing said head within said half cylindrical members, biasing means for biasing said sleeve upwardly into engagement with said half cylindrical members, means for disengaging the engagement of said sleeve and said half cylindrical members for severing said link, said means comprising a pin secured to said sleeve and passing entirely through said sleeve transversely thereof and slidable in a slot in said load carrying member, a pin extending axially through said load carrying member and through said cylinder, a head on said pin contacting said transversely extending pin, motor means for applying force to the upper end of said axial pin for moving said axial pin downwardly in said slot, carrying said sleeve with it to disengage said sleeve from said half cylindrical members, said conical head operating to push said half cylinders away from each other for releasing said head from said half cylinders, thereby releasing said load from said load support when said motor is activated.

4. A device as set forth in claim 3 wherein complementary mated annular angular shoulders located on said half cylinders and said head operate to swing said members outwardly when said sleeve and said mated half cylindrical members are disengaged.

References Cited in the file of this patent

UNITED STATES PATENTS

| 2,831,400 | Hosli | Apr. 22, 1958 |

FOREIGN PATENTS

| 1,051,338 | France | Sept. 16, 1953 |
| 1,115,485 | France | Apr. 25, 1956 |
| 1,131,173 | France | Feb. 18, 1957 |